United States Patent [19]
Barger et al.

[11] Patent Number: 5,767,488
[45] Date of Patent: Jun. 16, 1998

[54] OVEN PREHEAT COUNTDOWN TIMER

[75] Inventors: James R. Barger, Vandalia; Tony J. Troiano, Dayton, both of Ohio; Thomas F. Welke, Stevensville, Mich.

[73] Assignee: Whirlpool Corporation, Benton Harbor, Mich.

[21] Appl. No.: 693,914

[22] Filed: Aug. 5, 1996

Related U.S. Application Data

[60] Provisional application No. 60/001,999 Aug. 7, 1995.
[51] Int. Cl.⁶ .................................................. H05B 1/02
[52] U.S. Cl. ................... 219/492; 219/720; 219/497; 219/413; 219/506; 99/332
[58] Field of Search ........................... 219/702, 710, 219/720, 506, 497, 501, 494, 411–414; 99/330–333, 325

[56] References Cited

U.S. PATENT DOCUMENTS

| | | |
|---|---|---|
| 4,517,431 | 5/1985 | Ueda .................. 219/10.55 B |
| 4,625,086 | 11/1986 | Karino . |
| 4,686,356 | 8/1987 | Ueda et al. . |
| 4,687,908 | 8/1987 | Thorne . |
| 4,761,539 | 8/1988 | Carmean . |
| 5,111,028 | 5/1992 | Lee . |
| 5,317,130 | 5/1994 | Burkett et al. . |
| 5,398,597 | 3/1995 | Jones et al. ................. 99/330 |

FOREIGN PATENT DOCUMENTS

| | | |
|---|---|---|
| 0 078 325 | 5/1982 | European Pat. Off. . |
| 0 119 580 | 9/1984 | European Pat. Off. . |
| 57-010029 | 1/1982 | Japan . |
| 57-187533 | 11/1982 | Japan . |
| 58-117927 | 7/1983 | Japan . |
| 61-272523 | 12/1986 | Japan . |
| 01 112684 | 5/1989 | Japan . |

*Primary Examiner*—Mark H. Paschall
*Attorney, Agent, or Firm*—Hill & Simpson

[57] ABSTRACT

A method for displaying preheat or oven thermal conditioning times in a countdown timer for both thermal and thermal convection ovens is provided. The method has the steps of providing an oven having an oven cavity, a heating element, a control panel for inputting cooking parameters, and controls connected to the heating element for operating the oven; selecting a preheat temperature using the input control panel, providing a preheat time by using the control system; determining if the oven cavity is pre-conditioned; executing a preheat cycle when the oven is not pre-conditioned; displaying the preheat time in a decrementing manner using the display; and ending the preheat cycle when the decrementing preheat time equals zero. An oven having an improved preheat system is also provided.

18 Claims, 3 Drawing Sheets

OVEN PREHEAT COUNTDOWN TIMER

This application claims the benefit of U.S. Provisional Application No. 60/001,999 filed Aug. 7, 1995.

BACKGROUND OF THE INVENTION

The present invention relates to household appliances, mainly ranges having an oven and more particularly to a oven having a preheat countdown timer and decrementing display.

Several types of ranges are available to the consumer today. For example, cook tops, separate ovens, thermal convection ovens and standard ovens are all commonly available. However, most users are only familiar with the standard ovens and their use.

Another disadvantage with known ovens relates to the method of performing a preheat cycle and providing the user with an indication when the oven is sufficiently preheated. The two prominent industry standards include: 1) providing a display of an increasing temperature and 2) illuminating an indicator light on the control panel until the oven is pre-heated. Neither of these methods provides the user with an estimate of how long the preheat cycle will take. Thus, the user must necessarily remain near the oven and continuously watch the displays to know when the preheat cycle is done. A more convenient and less demanding method is needed to allow a busy user more freedom from continuously watching the oven.

U.S. Pat. No. 5,317,130 discloses an oven control which receives inputs from temperature sensors and compensates for increases in the oven cavity temperature when food items are cooked in rapid succession.

Accordingly, a need has arisen in the area of thermal convection ovens to provide a countdown timer that displays a preheat time in a decrementing manner.

SUMMARY OF THE INVENTION

Accordingly, it is an object of the present invention to provide a method for preheating an oven having a control system to operate the oven, input means for setting cooking parameters, and means for displaying a time remaining until a preheat cycle is complete, the method comprising the steps of: selecting a preheat temperature using the input means for setting cooking parameters; providing a preheat time by using the control system of the oven; determining if the oven cavity is pre-conditioned; executing a preheat cycle when the oven is not pre-conditioned; displaying the preheat time in a decrementing fashion using the display means of the oven; and ending the preheat cycle when the decrementing preheat time equals zero.

It is an advantage of the present invention to provide a countdown timer for displaying the preheat time in a decrementing manner after the user inputs the desired preheat temperature setting. The advantage of the present invention lies in the convenience for the user and the added advantage of providing the proper cooking temperature without any extra effort on the user's part.

Another advantage of the present invention is to provide a countdown timer that is simple to use.

A further advantage of the present invention is to provide a pre-heating system for the oven that displays a counting down of the time until the oven is ready to be used at the preset pre-heat temperature selected by the user.

DESCRIPTION OF THE PREFERRED EMBODIMENTS

Figure 1:
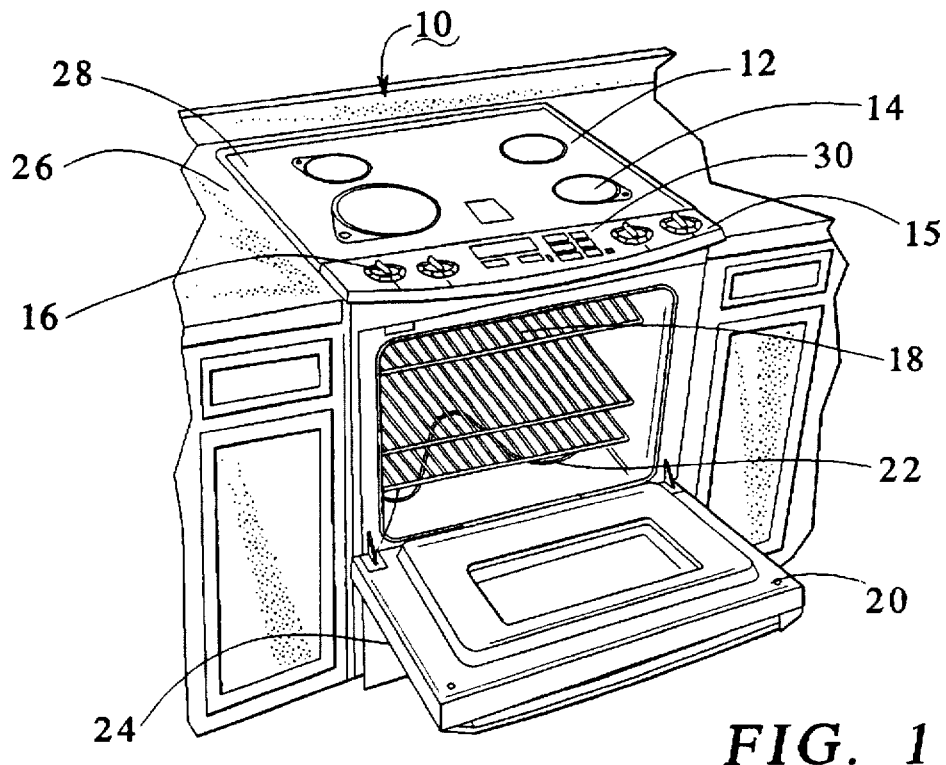
FIG. 1 is a perspective view of an appliance illustrating a range having a control panel with which the oven preheat countdown timer of the present invention can be utilized.

FIG. 1 illustrates an appliance generally at 10 which shows a range. The range 10 has a cooktop surface 12 having a plurality of burners 14 and a control panel 15. The control panel 15 provides cooktop control knobs 16 for controlling the burners 14 on the cooktop surface 12. The range 10 also provides an oven cavity 18 for baking and broiling food. The range 10 also has an oven door 20. FIG. 1 shows the range with the oven door 20 in an open position. The open oven door 20 exposes the oven cavity 18 and a heating element 22 therein. A storage drawer 24 is provided beneath the oven cavity 18. Also shown is a counter top 26. The cooktop surface 12 is flush with the counter top 26.

Another feature of the cooktop surface 12 is an oven vent 28 located near the rear of the cooktop surface 12. Toward the front of the cooktop surface 12 is the control panel 15 which further has an electronic oven control 30 for controlling the oven cavity 18. The electronic oven control 30 is further described below with reference to FIG. 2.

Figure 2:
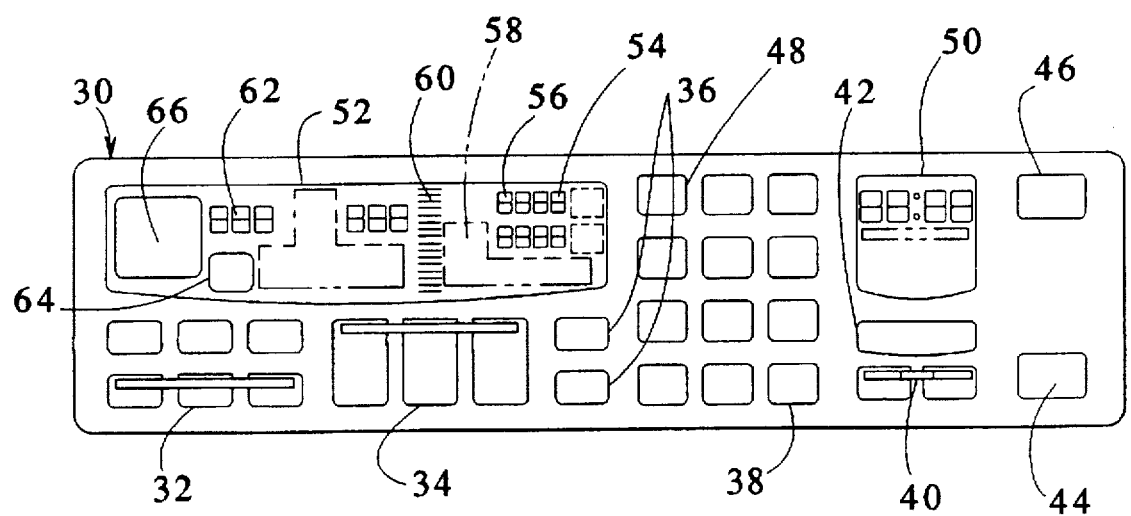
FIG. 2 is a plan view of an electronic oven control of the present invention.

FIG. 2 illustrates the electronic oven control 30 of the present invention. As shown, the electronic oven control 30 has a multitude of pads and displays thereon to provide a convenient interface for a user when cooking foods using the thermal convection oven. In a preferred embodiment, the plurality of pads are membrane switch pads, which allow a clean, flush appearance and simple use. Also, vacuum fluorescent displays are preferred. Beginning in the lower left corner of the electronic oven control 30 and continuing in a counter-clockwise direction, a brief description of the components of the electronic oven control 30 will now be described.

The electronic oven control 30 provides oven setting pads 32 for choosing between convection and standard cooking and baking. Also provided are timed and delayed cooking pads 36, an oven light pad 38 and timer pads 40. For convenience, a clock set-start pad 42 is also provided.

In addition, the electronic oven control 30 provides a cancel/off pad 44 and a start pad 46. Also, number pads 48 having digits 0–9 are provided for inputting numerical values for cooking temperatures and times.

Moreover, the electronic oven control 30 provides a time of day/timer display 50 and an oven display 52. The timer display 50 and the oven display 52 provide valuable information to the user of the oven. For example, the oven display 52 has digital readouts of several oven-related variables and indicators. For example, a digital start time 54 and digital stop time 56 are provided. Also provided is a check food indicator 58 for instructing a user when to check on the food to see if it is done cooking. A bar graph indicator 60 has a number of segments in a vertical column to graphically display the decrementing time until the oven cavity 18 is at the selected preheat temperature. A digital temperature read-out 62 provides the user with the temperature of the oven cavity 18. Also, an ON indicator 64 is provided so that the user knows the oven is on. Finally, an oven indicator 66 symbolically shows which elements of the oven cavity 18 are active at a certain time, for example whether convection is operating or standard conventional operation is being used. When a user desires to prepare food in the range 10 as shown in FIG. 1 having an electronic oven control 30 as shown in FIG. 2, the user follows certain steps to assure proper cooking or baking of the food.

For example, the oven cavity 18 of the range 10 must be set to the proper temperature to provide proper cooking or baking of the food. This is customarily done by preheating the oven cavity 18. As mentioned above, prior art oven pre-heat systems require the user to remain near the oven and continuously watch the displays to see when the oven is adequately preheated.

Figure 3:
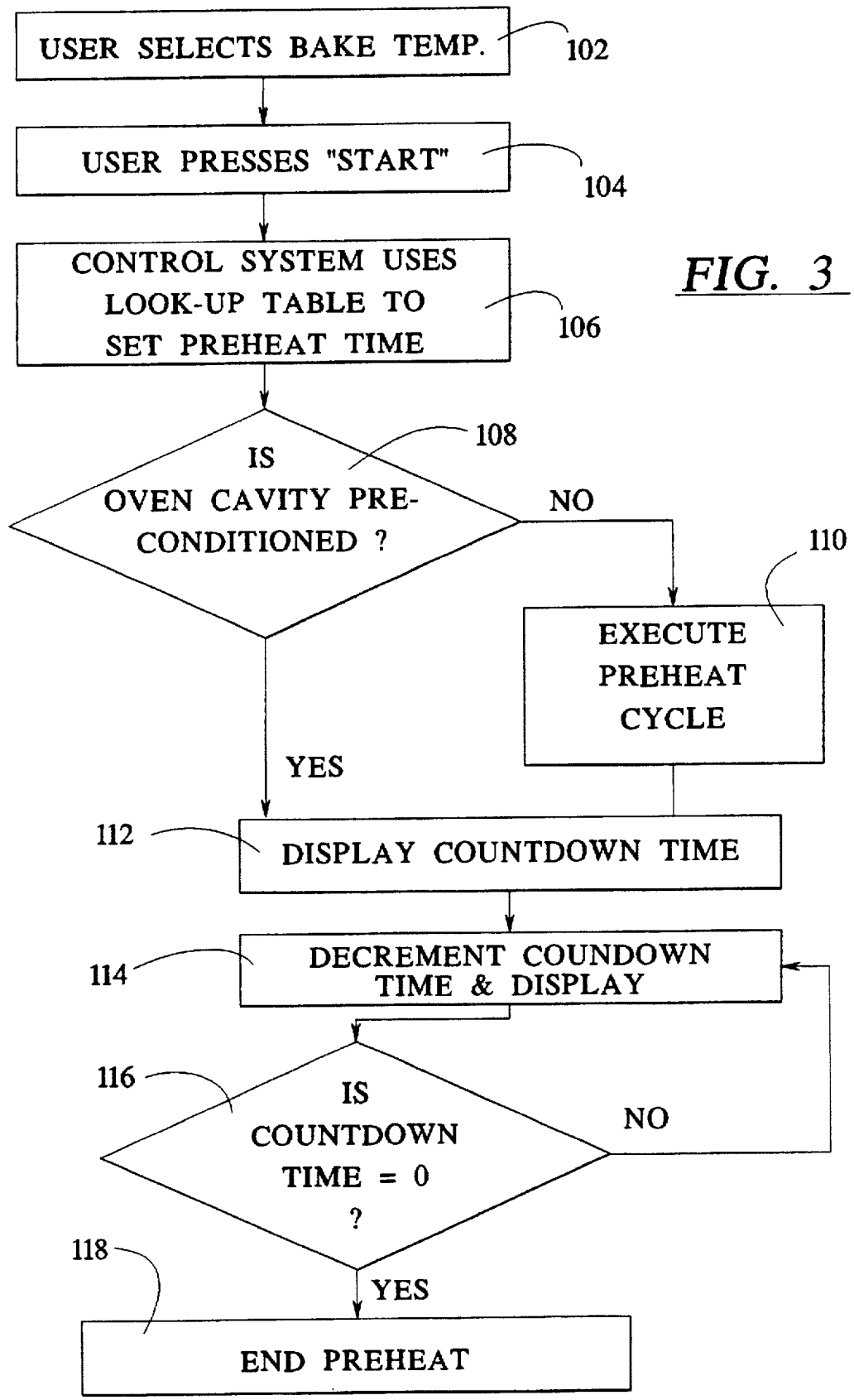
FIG. 3 illustrates a flowchart of the steps necessary to display a pre-heat countdown time of the present invention.

The present invention further provides the advantageous feature of displaying a countdown of the time necessary until a selected pre-heat temperature is reached by the oven. This is advantageous in that the oven provides a display of the time necessary to reach a given temperature selected by the user and counts down the time so that the user knows when the oven will be ready for cooking at the proper temperature selected. The manner in which this is performed is illustrated in FIG. 3. As shown in step 102, the user selects a bake temperature using the number pads 48 on the electronic oven control 30 of the present invention. Next in step 104, the user presses start pad 46. In step 106, a control system in the oven then uses a look-up table method to set the pre-heat time. The table is separated into three heating fields to closely approximate the amount of set time to be used for the pre-heat cycle period. There are many ways in which the set time could be arrived at, for example, calculation of the time using the slope of two separate readings made by a temperature sensor. Another example of arriving at the set time is to utilize the thermal characteristics of the energy delivery and retention system of the oven. Other ways are also possible to one skilled in the art.

The next step 108 is to determine if the oven cavity has been pre-conditioned. This is a question of whether the oven cavity has a temperature of less than 170° F. If the temperature of the oven cavity is greater than 170° F., no pre-heat cycle step 110 is executed. A display of the countdown time will be presented on the oven display 52 as shown in step 112. Also, the bar graph 60 will decrement and become shorter as the time decreases as indicated in step 114. Thus, the countdown until the pre-heat temperature is reached is displayed until the countdown time equals zero as checked in step 116. At this point in step 118, the pre-heat cycle will be completed.

An advantage of the present invention is that such a display is more useful to a consumer than the current practice of an indicator light that extinguishes when the pre-heat temperature is reached. Also, the industry standard is to display an incrementing temperature within the oven which is of little use to a consumer. This is because the consumer does not know when the oven will be ready unless constant supervision of the oven is performed. With the advantageous present invention, the user can simply see how much time it will take to pre-heat the oven and return to the oven at that later time to begin cooking.

Figure 4:
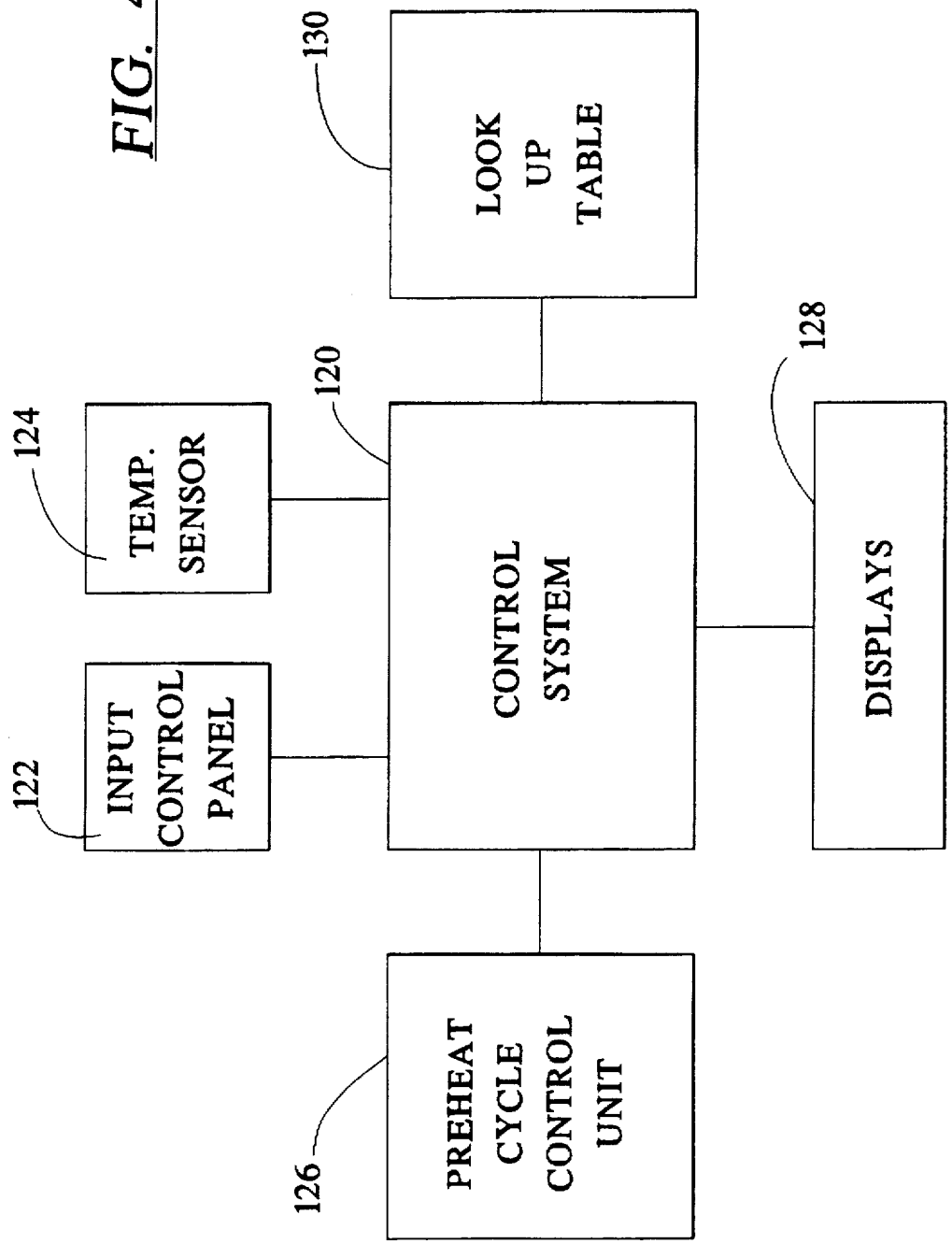
FIG. 4 is a block diagram of an embodiment of an oven incorporating the improved preheat countdown timer of the present invention.

FIG. 4 illustrates a functional block diagram of the elements of an oven having an improved preheat countdown timer manufactured in accordance with the principles of the present invention. As illustrated, the heart of the improved countdown timer for the oven is a control system 120. The control system receives inputs, for example, the preheat set temperature, from an input control panel 122. Other cooking parameters may also be selected using the input control panel 122. In addition, a temperature sensor 124 is connected to the control system 120 to determine if the oven is pre-conditioned, as explained above. Further, a preheat cycle control unit 126 is also connected to the control system 120 to execute a preheat cycle when the oven is not pre-conditioned. Finally, the oven having the improved preheat countdown timer for displaying decrementing preheat times utilizes displays 128 connected to the control system 120. These displays 128 may be as described above. The displays 128 can include digital numerical data as well as graphical data. Also, in an embodiment of the present invention, a look-up table 130 is provided. The look-up table 130 is accessible by using the control system 120 of the oven to provide a preheat time. Various other sensors can be connected to the control system as needed.

As is apparent from the foregoing specification, the invention is susceptible of being embodied with various alterations and modifications which may differ particularly from those that have been described in the specification. It should be understood that we wish to embody within the scope of the patent warranted hereon, all such modifications as reasonably and properly come within the scope of our contribution to the art.

The embodiments of the invention in which an exclusive property or privilege is claimed are therefore defined as follows:

1. A method for preheating an oven having a control system to operate the oven, input means for setting cooking parameters, and means for displaying a time remaining until a preheat cycle is complete, the method comprising the steps of:

selecting a preheat temperature using the input means for setting cooking parameters;

providing a preheat time by using the control system of the oven;

determining if the oven cavity is pre-conditioned, wherein the oven cavity is pre-conditioned when a temperature in the oven is greater than a predetermined temperature and the predetermined temperature is greater than a room temperature and less than the preheat temperature;

executing a preheat cycle when the oven cavity is not pre-conditioned;

displaying the preheat time in a decrementing fashion using the display means of the oven;

ending the preheat cycle when the decrementing preheat time equals zero; and accessing a look-up table to provide a preheat time.

2. The method of claim 1, wherein the step of determining when the oven cavity is pre-conditioned is further defined by determining if the oven cavity has a temperature of less than 170° F.

3. The method of claim 1, wherein the oven is a conventional oven.

4. The method of claim 1, further comprising the step of: displaying the decrementing preheat time graphically.

5. The method of claim 1, wherein the step of providing a preheat time is defined by using thermal characteristics of an energy delivery and retention system of the oven.

6. The method of claim 1, wherein the step of providing a preheat time is further defined by using a slope of at least two temperature sensor measurements.

7. An oven having an improved pre-heat system, comprising:

a control system;

an input means for setting a cooking temperature connected to the control system;

means for determining if the oven is pre-conditioned, wherein the oven is pre-conditioned when a temperature in the oven is greater than a predetermined temperature and the predetermined temperature is greater than a room temperature and less than the cooking temperature connected to the control system;

a look-up table accessed by the control system;

means for executing a preheat cycle when the oven is not pre-conditioned connected to the control system; and means for displaying the preheat time in a decrementing fashion.

8. The oven having an improved preheat system of claim 7, further comprising:

means for ending the preheat cycle when the decrementing preheat time equals zero.

9. The oven having an improved preheat system of claim 7, further comprising:

a control panel connected to the control system, the control panel having a plurality of input keys.

10. The oven having an improved preheat system of claim 7, further comprising:

means for displaying the decrementing preheat time graphically.

11. The oven having an improved preheat system of claim 10, wherein the means for displaying the decrementing preheat time graphically is a bar code display.

12. The oven having an improved preheat system of claim 7, further comprising:

means for measuring the oven temperature; and means for calculating a preheat time connected to the means for measuring the oven temperature.

13. The oven having an improved preheat system of claim 7, further comprising:

means for calculating the preheat time based upon energy delivery and retention of the oven.

14. The oven having an improved preheat system of claim 7, further comprising:

a plurality of user indicators related to oven operation.

15. The oven having an improved preheat system of claim 7, wherein the control system includes a microprocessor.

16. The oven having an improved preheat system of claim 7, wherein the control system includes a means for storing data.

17. An oven having an improved preheat system, comprising:

a control system;

an input device for setting a temperature of the oven connected to the control system;

a temperature sensing device constructed and arranged in the oven to determine if the oven is pre-conditioned, wherein the oven is pre-conditioned when a temperature in the oven is greater than a predetermined temperature and the predetermined temperature is greater than a room temperature and less than a preheat temperature, the temperature sensing device being connected to the control system;

a preheat time calculation device including a look-up table, the preheat time calculation device connected to the control system; and a display constructed and arranged on the oven to provide a decrementing preheat time display.

18. The oven having an improved preheat system of claim 17, wherein the control system further comprises:

a microprocessor having a memory.

* * * * *